United States Patent [19]

Knight

[11] 4,371,793

[45] Feb. 1, 1983

[54] DUAL-MODE CONTROL SIGNAL GENERATING APPARATUS

[75] Inventor: Mark B. Knight, Somerville, N.J.

[73] Assignee: RCA Corporation, New York, N.Y.

[21] Appl. No.: 257,104

[22] Filed: Apr. 24, 1981

[51] Int. Cl.[3] .......................................... H03K 3/023
[52] U.S. Cl. .................................. 307/260; 307/241; 307/360; 328/60; 358/18
[58] Field of Search ................. 328/60; 307/260, 241, 307/475, 360

[56] References Cited

U.S. PATENT DOCUMENTS

| 3,725,792 | 4/1973 | Kellogg | 328/60 |
| 3,854,057 | 12/1974 | Williams et al. | 307/241 |
| 4,262,218 | 4/1981 | Ishii | 307/241 |

OTHER PUBLICATIONS

"Analog Integrated Circuit Design," pp. 130-131, by Alan Grebene, published 1972 by Van Nostrand Reinhold.

Copending U.S. Patent Application (RCA 72,728) of Werner Hinn, entitled "SECAM Identification System".

Primary Examiner—John S. Heyman
Attorney, Agent, or Firm—Eugene M. Whitacre; Paul J. Rasmussen; William H. Meagher

[57] ABSTRACT

Dual-mode control signal generator, responding to alternative forms of mode selection signal input by generating different arrays of control signal outputs, includes a trio of voltage comparators. In first form, mode selection signal consists of pulse train with DC component of such a magnitude that all signal excursions remain above a reference potential; in second form, DC component magnitude is such that all signal excursions remain below reference potential. In first comparator, comparison of signal with reference potential switches unvarying control current between output current paths in dependence upon form of control signal. In second comparator, comparison of level shifted signal with reference potential results in a pulse train output, but only in presence of first form of selection signal. In third comparator, comparison of oppositely level shifted signal with reference potential results in development of complementary pulse train outputs in presence of second form of selection signal. Intercoupling with first comparator precludes development of outputs by third comparator in presence of first form of selection signal.

7 Claims, 2 Drawing Figures

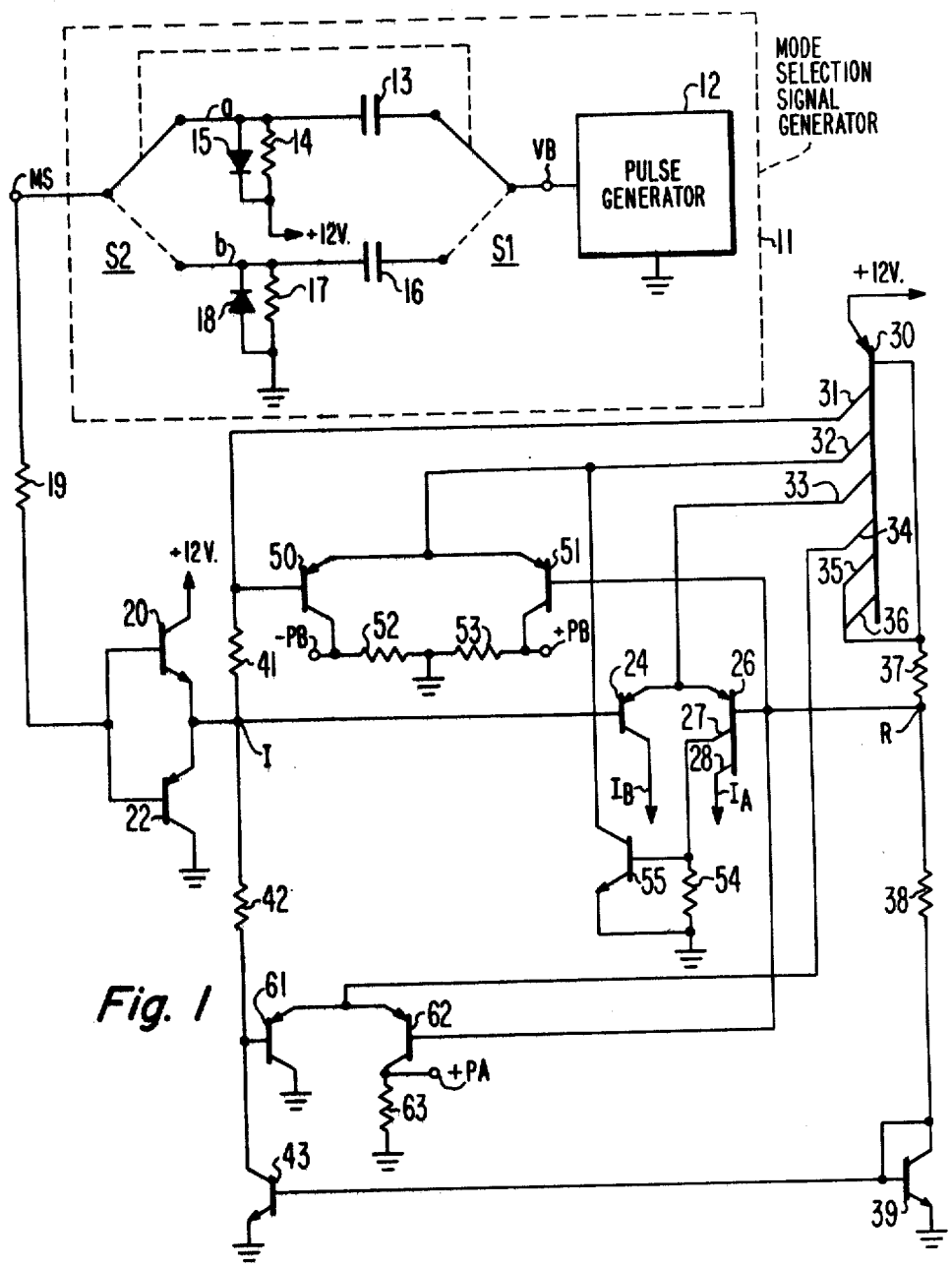

DUAL-MODE CONTROL SIGNAL GENERATING APPARATUS

The present invention relates generally to control signal generation, and particularly to dual-mode signal generating apparatus responsive to a mode selection signal for supplying to a plurality of outputs a first array of control signals upon recognition of the selection of a first operating mode, and for supplying to said plurality of outputs a different array of control signals upon recognition of the selection of an alternative operating mode.

In a copending U.S. Pat. No. 4,357,623 issued Nov. 2, 1982 of W. Hinn, concurrently filed herewith and entitled "SECAM IDENTIFICATION SYSTEM," there is disclosed a dual-mode SECAM identification system, serving to identify and correct an incorrect mode of line-by-line switching in a receiver for SECAM-encoded color TV signals. The dual-mode SECAM identification system of said copending application is capable of alternative operation in a first ("vertical identification") mode in which identification information is derived from identification oscillations appearing in the received SECAM signal during successive line intervals within each vertical blanking period, and in a second ("horizontal identification") mode in which identification information is derived from lead-in bursts appearing in the received SECAM signal during active line intervals just prior to appearance of image-representative signals.

The apparatus of the aforesaid identification system includes an FM detector responsive to the received SECAM signal, and sample-and-hold circuits responsive to the output of the FM detector. Control of the center frequency tuning of the FM detector, of the gain of the FM detector, and of the sampling times of the sample-and-hold circuits, is effected differently in the respective alternative modes of operation of the identifications.

In the use of common circuitry for the development of control waves for the aforesaid functions in either selected mode, in addition to inputs supplied with independence of the mode selected, a requirement exists for mode-sensitive inputs that convey a first array of control signals when one mode is selected, and a different array of control signals when the other mode is selected. In an illustrative embodiment of the aforesaid dual-mode identification system, the mode-sensitive inputs desired for one identification mode are: (1) a unidirectional control current of a desired polarity in a first control current path; (2) zero current in a second control current path; (3) a train of positive-going vertical blanking pulses at a first control potential terminal; (4) a fixed (e.g., ground potential at a second control potential terminal; and (5) a fixed (e.g., ground) potential at a third control potential terminal. In contrast, the mode-sensitive inputs desired for the other identification mode are: (1) zero current in said first control current path; (2) a unidirectional control current of said desired polarity in said second control current path; (3) a fixed (e.g., ground) potential at said first control potential terminal; (4) a train of positive-going vertical blanking pulses at said second control potential terminal; and (5) a train of negative-going vertical blanking pulses at said third control potential terminal.

In the system of the aforementioned Hinn application, the mode selection signal takes the form of a train of vertical blanking pulses accompanied by a DC component of one magnitude when the vertical identification mode is selected, and accompanied by a DC component of a different magnitude when the horizontal identification mode is selected. The respected DC component magnitudes and the pulse swing magnitude are such that in one form of the mode selection signal, the voltage excursions thereof all remain above a reference potential, whereas, in the other form of mode selection signal, the voltage excursions thereof remain below said reference potential.

In accordance with the principles of the present invention, dual-mode signal generating apparatus designed for cooperation with mode selection signals of the above-described type includes a plurality of voltage comparators. Illustratively, one of the voltage comparators includes a first pair of transistors with interconnected emitter electrodes supplied with a substantially constant current from a common current source, with the base of one transistor directly connected to a mode selection signal input terminal, and with the base of the other transistor connected to a voltage divider output terminal exhibiting the aforementioned reference potential. A current path connected to the collector of said one transistor exhibits an unvarying unidirectional current of a desired polarity in the presence of one form of mode selection signal, and zero current in the presence of the other form of mode selection signal. Conversely, a current path connected to a collector of the other transistor exhibits zero current in the presence of said one form of mode selection signal, and exhibits an unvarying unidirectional current of said desired polarity in the presence of said other form of mode selection signal. The system of the Hinn application includes a comparator with similar performance.

However, in accordance with the principles of the present invention, an additional comparator with different performance is also associated with the reference-potential-establishing voltage divider. Illustratively, the additional comparator includes a second pair of transistors with interconnected emitter electrodes supplied with a substantially constant current from a common current source, with the base of one transistor coupled to the mode selection signal input terminal via a resistor, and with the base of the other transistor connected to the aforesaid voltage divider output terminal. A unidirectional translating current is supplied to the resistor with such a magnitude and direction that the voltage excursions of one form of the mode selection signal (to the exclusion of the other form) at the base of said one transistor swing about (i.e., above and below) the reference potential. As a consequence, for example, with a load impedance coupled to the collector of one of the transistors, a pulse train will be developed across said load impedance, but only in the presence of said one form of mode selection signal, to the exclusion of the other. Illustratively, zero voltage is developed across the load impedance in the presence of the other form of mode selection signal.

In accordance with an illustrative embodiment of the present invention, the dual-mode signal generating apparatus additionally includes a third voltage comparator also associated with the reference-potential-establishing voltage divider. Illustratively, the third comparator includes a third pair of transistors with interconnected emitter electrodes supplied with a substantially constant current from a common current source, with the base of one transistor coupled to the mode selection signal input terminal via a second resistor, with the base of the other transistor connected to the aforesaid voltage divider output terminal, and with respective load impedances individually connected to the respective collector electrodes. A unidirectional translating current is supplied to the second resistor with such a magnitude and direction that the voltage excursions of said other form of mode selection signal (to the exclusion of said one form) at the base of said one transistor swing above and below the reference potential. As a consequence, a pulse train of inverted polarity is developed across one load impedance, and a pulse train of noninverted polarity is developed across the other load impedance, but only in the presence of said other form of mode selection signal, to the exclusion of said one form. In order to provide zero voltage across both load impedances in the presence of said one form of mode selection signal, a diversion path is provided for the current normally supplied to the interconnected emitter electrodes of the third transistor pair. An additional transistor, with its collector electrode connected to said interconnected emitter electrodes, and with its base-emitter path responsive to current from a collector electrode of an appropriate one of the first transistor pair, serves to provide the diversion path in the presence of said one form of mode selection signal.

For reliability of operation, the translating currents, and the source currents for the respective transistor pairs, are desirably derived from the reference current that traverses the reference-potential-establishing voltage divider by current mirror circuitry.

In the accompanying drawing:

FIG. 1 illustrates schematically dual-mode signal generating apparatus embodying the principles of the present invention, in cooperation with a mode selection signal generator of the above-discussed type; and FIG. 2 illustrates graphically voltage waveforms of aid in explaining the operation of the apparatus of FIG. 1.

In the arrangement of FIG. 1, a mode selection signal generator 11 includes a pulse generator 12, which develops a train of positive-going pulses at the pulse generator output terminal VB. A first single-pole, double-throw switch S1, when in the switching state illustrated in FIG. 1 by a solid line showing, couples terminal VB to the positive terminal (e.g., +12 V) of a unidirectional operating potential supply via the series combination of a capacitor 13 and a resistor 14 (shunted by a diode 15) arranged in the order named, with the cathode of diode 15 connected to the +12 V. terminal. A second single-pole, double-throw switch S2 (ganged with switch S1), in the switching state illustrated in FIG. 1 by a solid line showing, links the mode selection signal output terminal MS to the junction of capacitor 13 and resistor 14. With the magnitude of the pulses developed by generator 12 chosen to be sufficiently smaller than an illustrative reference potential ($V_R$) value of +6 volts (half the potential at the +12 V. terminal), clamping action by diode 15 during pulse appearances results in development of voltage variations at terminal MS in the form of waveform "a" of FIG. 2. It will be noted that all of the voltage excursions of waveform "a" are significantly above (i.e., here, more positive than) the reference potential level of +6 V.

When the ganged switches S1 and S2 are in the switching state illustrated by the dotted-line showing of FIG. 1, pulse generator output terminal VB is coupled to the negative terminal (e.g., ground) of the operating potential supply via the series combination of a capacitor 16 and a resistor 17 (shunted by a diode 18) arranged in the order named, with the anode of diode 18 connected to the ground terminal; and terminal MS is linked to the junction of capacitor 16 and resistor 17. Clamping action by diode 38 during inter-pulse intervals results in development of voltage variations at terminal MS in the form of waveform "b" of FIG. 2. It will be noted that all of the voltage excursions of waveform "b" are significantly below (i.e., here less positive than) the reference potential level of +6 V.

The dual-mode signal generating apparatus responsive to the mode selection signal at terminal MS in FIG. 1 includes a multiple-collector PNP transistor 30 (desirably of lateral construction) having its emitter electrode connected to the positive terminal (+12 V.) of the operating potential supply. The base of transistor 30, to which two (35, 36) of the collector electrodes thereof are directly connected, is connected via resistors 37 and 38 to the collector of an NPN transistor 39, connected as a diode, with its base and collector electrodes directly interconnected. The emitter electrode of transistor 39 is directly connected to the negative terminal (ground) of the operating potential supply.

The described connections to the operating potential supply cause a reference unidirectional current to traverse a voltage divider formed by resistors 37 and 38, developing a reference potential $V_R$ at the junction (R) of resistors 37 and 38. Illustratively, resistors 37 and 38 are proportioned to establish $V_R$ at +6 volts (half the potential at the +12 V. terminal).

By conventional current mirror circuit operation, currents are available at the remaining collector electrodes (31, 32, 33, and 34) of transistor 30 which mirror in desired proportions the aforesaid reference current. The collector current from collector 33 is supplied as a substantially constant current to the interconnected emitter electrodes of PNP transistors 24 and 26, which form a first voltage comparator. The collector current from collector 34 is supplied at a substantially constant current to the interconnected emitter electrodes of PNP transistors 61 and 62, which form a second voltage comparator. The collector current from collector 32 is supplied as a substantially constant current to the interconnected emitter electrodes of PNP transistors 50, 51 which form a third voltage comparator. The collector current from collector 31 is supplied as a substantially constant translating current to a level shifting resistor 41, connected between collector 31 and a mode selection signal input terminal (I). A grounded-emitter NPN transistor 43, disposed with its base-emitter path directly in shunt with the base-emitter path of diode-connected transistor 39 to establish a current mirror relationship therewith, draws a substantially constant translating current through a level shifting resistor 42, connected between terminal I and the collector of transistor 43.

Illustratively, with appropriately matching configurations for the collectors of transistor 30, the source current for the first comparator, the translating current from collector 31, and the respective source currents for the second and third comparators, each substantially correspond to half the reference current. With a 2:1 emitter area ratio for transistors 39 and 43, the collector current drawn by transistor 43 also substantially corresponds to half the reference current.

The base electrode of transistor 26 of the first comparator, the base electrode of transistor 62 of the second comparator, and the base electrode of transistor 51 of the third comparator, are each directly connected to the voltage divider output terminal R. The base electrode of the other transistor (24) of the first comparator is directly connected to the mode selection signal input terminal I. The base of the other transistor (61) of the second comparator is connected to terminal I via level shifting resistor 42. The base of the other transistor (50) of the third comparator is connected to terminal I via level shifting resistor 41.

An NPN transistor 55 is disposed with its collector electrode directly connected to the interconnected emitter electrodes of the transistors (50, 51) of the third comparator. The emitter electrode of transistor 55 is grounded, and the base electrode thereof is directly connected to a collector electrode (27) of transistor 26 of the first comparator. A resistor 54 shunts the base-emitter path of transistor 55.

The collector current from a second collector electrode (28) of transistor 26 of the first comparator is supplied as a first output control current $I_A$ to suitable control current utilization means (not shown). The collector current from the collector electrode of the other transistor (24) of the first comparator is supplied as a second output control current $I_B$ to additional control current utilization means (also not shown).

The collector electrode of transistor 61 of the second comparator is directly connected to the ground terminal. A load resistor 63 is connected between ground and the collector electrode of the other transistor (62) of the second comparator. A first control potential output terminal +PA is directly connected to the collector electrode of transistor 62.

Respective load resistors 52 and 53 are connected between the respective collector electrodes of the transistors (50, 51) of the third comparator and ground. A second control potential output terminal +PB is directly connected to the collector electrode of transistor 51. A third control potential output terminal −PB is directly connected to the collector electrode of transistor 50.

For coupling of the mode selection signal from generator 11 to input terminal I, an NPN transistor 20 and a PNP transistor 22 have their respective base electrodes jointly connected via a resistor 19 to output terminal MS of generator 11, and their emitter electrodes jointly connected to input terminal I. The collector electrode of transistor 20 is directly connected to the positive supply terminal (+12 V.), and the collector electrode of transistor 22 is directly connected to the negative supply terminal (ground).

An illustrative set of values for the resistances in an integrated circuit realization of the dual-mode control signal generating apparatus of FIG. 1 include: 17.5 kilohms for each of the divider resistors (37, 38); 39 kilohms for each of the load resistors (52, 53, 63); 33 kilohms for level shifting resistor 42; 33 kilohms for level shifting resistor 41; and 22 kilohms for resistor 54.

For an explanation of the operation of the FIG. 1 arrangement, it shall first be assumed that generator 11 develops waveform "a" at terminal MS. Transistor 20, functioning as an emitter-follower, couples the input waveforms to terminal I. With all of the waveform "a" excursions maintaining the potential at the base of transistor 24 significantly more positive than the reference potential ($V_R$) at the base of transistor 26, transistor 24 is maintained in a cutoff condition, and the current supplied to the first comparator is fully conducted by transistor 26. Under these conditions, the first output control current $I_A$, derived from collector 28 of conducting transistor 26, is a substantially unvarying unidirectional current of a desired magnitude and direction, while the second output control current $I_B$, derived from the collector of cutoff transistor 24, is of zero value.

Current from the collector 27 of conducting transistor 26 renders transistor 55 conducting to a degree effecting diversion of the current from collector 32 (of transistor 30) away from the third comparator, and causing cutoff of the transistors 50 and 51 of the third comparator. In the absence of conduction by transistors 50 and 51, the potentials at the second and third control potential output terminals (+PB, −PB) are unchanging (at ground potential).

With appropriate parameter choices, the level shift for waveform "a" effected across resistor 42 is such that the potential at the base of transistor 61 of the second comparator is more positive than $V_R$ (appearing at the base of transistor 62) during the recurring pulse appearances, but less positive than $V_R$ during the inter-pulse intervals. Desirably, the swing is of sufficient magnitude as to switch the current supplied to the second comparator between the respective comparator transistors (62,61) during the respective waveform portions, such that transistor 61 is cut off during the pulse appearances and transistor 62 is cut off during the inter-pulse intervals. As a consequence, a train of positive-going pulses, corresponding to a noninverted version of the pulse train of waveform "a," appears at the first control potential output terminal +PA.

When waveform "b" is delivered to terminal MS, it is coupled by transistor 22, functioning as an emitter-follower, to terminal I. With all of the waveform "b" excursions maintaining the potential at the base of transistor 24 significantly less positive than the reference potential ($V_R$) at the base of transistor 26, transistor 26 is maintained in a cutoff condition and the current supplied to the first comparator is fully conducted by transistor 24. Under these conditions, the second output control current $I_B$, derived from the collector of conducting transistor 24, is a substantially unvarying current of a desired magnitude and direction, while the first output control current $I_A$, derived from collector 28 of cutoff transistor 26 is of zero value.

In the absence of current from the collector 27 of transistor 26 (now in cutoff), transistor 55 is rendered nonconducting, and no diversion of the current to the third comparator is effected. With appropriate parameter choices, the level shift for waveform "b" effected across resistor 41 is such that the potential at the base of transistor 50 of the third comparator is more positive than $V_R$ (appearing at the base of transistor 51) during the recurring pulse appearances, but less positive than $V_R$ during the inter-pulse intervals. Desirably, the swing is of sufficient magnitude as to switch the current supplied to the third comparator between the respective comparator transistors (51,50) during the respective waveform portions, such that transistor 50 is cut off during the pulse appearances and transistor 51 is cut off during the inter-pulse intervals. As a consequence, (1) a train of positive-going pulses, corresponding to a noninverted version of the pulse train of waveform "b," appears at the second control potential output terminal +PB, and (2) a train of negative-going pulses, corresponding to an inverted version of the pulse train of waveform "b," appears at the third control potential output terminal —PB.

Throughout delivery of waveform "b," the potential at the base of transistor 61 is maintained significantly less positive than $V_R$ (appearing at the base of transistor 62). Transistor 62 is thus maintained in a cut off condition, and the current supplied to the second comparator is fully conducted by transistor 61. In the absence of conduction by transistor 62, the potential at the first control potential output terminal (+PA) is unchanging (at ground potential).

An illustrative use of the FIG. 1 arrangement is for control signal generation for a dual-mode identification system of the type disclosed in the aforesaid copending Hinn application. In such use, the pulses of the mode selection signal (provided by generator 11) are desirably timed so as to constitute vertical blanking pulses. When the comparators of the FIG. 1 arrangement herein are used in conjunction with the detector tuning control, detector gain control, and sampling control systems of the Hinn application, waveform "a" is appropriate for selection to establish the horizontal identification mode, and waveform "b" is appropriate for selection to establish the vertical identification mode.

In the showing of FIG. 1, the mode selection signal generator 11 has been illustrated as incorporating discrete diodes 15 and 18 for clamping purposes in the development of the respective waveforms "a" and "b." In practice, the presence of these diodes is not essential, because the clamping function of diode 15 can readily be performed by the base-collector junction of NPN transistor 20, and the clamping function of diode 18 can readily be performed by the base-collector junction of PNP transistor 22.

What is claimed is:

1. Dual-mode control signal generating apparatus for (1) supplying to a plurality of outputs a first array of control signals in response to delivery to an input terminal of an input pulse train accompanied by a DC component of a first magnitude, and (2) supplying to said outputs a different array of control signals in response to delivery to said input terminal of said input pulse train accompanied by a DC component of a second magnitude; said apparatus comprising:

a reference current path including a first resistor in series with a second resistor;

means for supplying a reference current to said reference current path;

first, second, third and fourth transistors, each having base, emitter and collector electrodes;

means for interconnecting the emitter electrodes of said first and second transistors;

a first control current path connected to a collector electrode of said first transistor;

a second control current path connected to a collector electrode of said second transistor;

means for supplying a first energizing current to said interconnected emitter electrodes of said first and second transistors;

means for (1) causing flow of a substantially unvarying control current in one of said control current paths to the exclusion of the other in the presence of input pulse train accompaniment by a DC component of said first magnitude, and for (2) causing flow of a substantially unvarying control current in said other of said control current paths to the exclusion of said one in the presence of input pulse train accompaniment by a DC component of said second magnitude; said flow causing means comprising means for rendering the potential at the base electrode of said first transistor responsive to the potential at said input terminal, and means for rendering the potential at the base electrode of said second transistor responsive to the potential at the junction of said first and second resistors;

means for interconnecting the emitter electrodes of said third and fourth transistors;

means for supplying a second energizing current to said interconnected emitter electrodes of said third and fourth transistors;

a load impedance coupled to a collector electrode of said fourth transistor; and means for causing output pulse train development across said load impedance only in the presence of input pulse train accompaniment by a DC component of said second magnitude; said output pulse train development causing means comprising:

means for rendering the potential at the base electrode of one of said third and fourth transistors responsive to the potential at the junction of said first and second resistors;

a third resistor;

current mirror means responsive to said reference current for causing flow of a translating current, proportional to said reference current, through said third resistor; and means for connecting said third resistor between said input terminal and the base electrodes of the other of said third and fourth transistors.

2. Apparatus in accordance with claim 1 wherein one of said first and second transistors is provided with a second collector electrode; said apparatus also including:

fifth, sixth and seventh transistors, each having base, emitter and collector electrodes;

means for interconnecting the emitter electrodes of said fifth and sixth transistors;

means for supplying a third energizing current to said interconnected emitter electrodes of said fifth and sixth transistors;

a second load impedance connected to a collector electrode of said fifth transistor;

a third load impedance connected to a collector electrode of said sixth transistor; and means for causing development of respective output pulse trains, mutually opposite in polarity across the respective second and third load impedances only in the presence of input pulse train accompaniment by a DC component of a given one of said first and second magnitudes; said last-named means comprising:

a fourth resistor;

second current mirror means responsive to said reference current for causing flow of a second translating current, proportional to said reference current, through said fourth resistor;

means for connecting said fourth resistor between said input terminal and the base electrode of said fifth transistor;

means for rendering the potential at the base electrode of said sixth transistor responsive to the potential at the junction of said first and second resistors;

means for connecting the collector electrode of said seventh transistor to the interconnected emitter electrodes of said fifth and sixth transistors; and means for rendering the base-emitter path of said seventh transistor responsive to the current, if any, conveyed by said second collector electrode.

3. Apparatus in accordance with claim 2 wherein the respective means for supplying said first, second and third energizing currents comprise additional current mirror means for rendering said first, second and third energizing currents respectively proportional to said reference current.

4. Dual-mode control signal generating apparatus for (1) supplying to a plurality of outputs a first array of control signals in response to delivery to an input terminal of an input pulse train accompanied by a DC component of a first magnitude, and (2) supplying to said outputs a different array of control signals in response to delivery to said input terminal of said input pulse train accompanied by a DC component of a second magnitude, and including: a current path including a first resistor in series with a second resistor traversed by a reference current; first and second transistors, having interconnected emitter electrodes to which is supplied a first energizing current, and respective collector electrodes, connected respectively to a first control current path and a second control current path, with one of said transistors having an additional collector electrode; means for rendering the potential at the base electrode of said first transistor responsive to the potential at said input terminal; and means for rendering the potential at the base electrode of said second transistor responsive to the potential at the junction of said first and second resistors so that (1) a substantially unvarying control current flows in one of said control current paths to the exclusion of the other in the presence of input pulse train accompaniment by a DC component of said first magnitude, and (2) a substantially unvarying control current flows in said other of said control current paths to the exclusion of said one in the presence of input pulse train accompaniment by a DC component of said second magnitude; said apparatus comprising:
third and fourth transistors, each having base, emitter, and collector electrodes;
means for interconnecting the emitter electrodes of said third and fourth transistors;
means for supplying a second energizing current to said interconnected emitter electrodes of said third and fourth transistors;
a load impedance coupled to the collector electrode of said third transistor;
a load impedance coupled to the collector electrode of said fourth transistor; and
means for causing development of respective control pulse trains, mutually opposite in polarity, across the respective load impedances only in the presence of input pulse train accompaniment by a DC component of a given one of said first and said second magnitudes; said control pulse train development causing means comprising:
means for rendering the potential at the base electrode of one of said third and fourth transistors responsive to the potential at the junction of said first and second resistors;
a third resistor;
current mirror means responsive to said reference current for causing a flow of a translating current, proportional to said reference current, through said third resistor;
means for connecting said third resistor between said input terminal and the base electrode of the other of said third and fourth transistors;
a fifth transistor having a collector electrode, and having a base-emitter path responsive to the current, if any, conveyed by said additional collector electrode; and
means for connecting the collector electrode of said fifth transistor to the interconnected emitter electrodes of said third and fourth transistors.

5. Dual-mode control signal generating apparatus, for use with a mode selection input signal alternatively of a first form comprising a pulse train accompanied by a DC component of a magnitude maintaining all signal excursions above a reference potential, or a second form comprising said pulse train accompanied by a DC component of a magnitude maintaining all signal excursions below said reference potential, and comprising:
a first voltage comparator, having a first input responsive to said reference potential and a second input responsive to said mode selection input signal, and including a first transistor rendered conducting only in the presence of a given one of said first and second forms of mode selection input signal, and a second transistor rendered conducting only in the presence of the other of said first and second forms of mode selection input signal, for developing output control currents in respective current paths coupled to said first and second transistors, respectively;
a source of energizing current;
a second voltage comparator including third and fourth transistors having interconnected emitter electrodes coupled to receive energizing current from said source, having respective collector electrodes coupled to respective output circuits, and having respective base electrodes;
means for applying said reference potential to one of said base electrodes;
means for applying a level shifted version of said mode selection input signal to the other of said base electrodes, with the level shift magnitude and direction being such that pulse trains of complementary polarity are developed in said output circuits in the presence of said given one of said first and second forms of mode selection signal; and
means, responsive to the conducting state of said second transistor, for diverting said energizing current from said interconnected emitter electrodes in the presence of said other of said first and second forms of mode selection signal.

6. Dual-mode control signal generating apparatus, for use with a mode selection input signal alternatively of a first form comprising a pulse train accompanied by a DC component of a magnitude maintaining all signal excursions above a reference potential, or a second form comprising said pulse train accompanied by a DC component of a magnitude maintaining all signal excursions below said reference potential, and comprising:
a first voltage comparator, having a first input responsive to said reference potential and a second input responsive to said mode selection input signal, and including a first transistor rendered conducting only in the presence of a given one of said first and second forms of mode selection input signal, and a second transistor rendered conducting only in the presence of the other of said first and second forms of mode selection input signal, for developing output control currents in respective current paths coupled to said first and second transistors, respectively;

a source of energizing current;

a second voltage comparator including third and fourth transistors having interconnected emitter electrodes coupled to receive energizing current from said source, and having respective collector and base electrodes;

an output circuit coupled to one of said collector electrodes;

means for applying said reference potential to one of said base electrodes; and means for applying a level shifted version of said mode selection input signal to the other of said base electrodes, with the level shift magnitude and direction being such that a pulse train is developed in said output circuit in the presence of said given one of said first and second forms of mode selection input signal.

7. Apparatus in accordance with claim 6 also including:

a second output circuit coupled to the other of said collector electrodes; and means, responsive to the conducting state of said second transistor, for diverting said energizing current from said interconnected emitter electrodes in the presence of said other of said first and second forms of mode selection input signal.

* * * * *